(No Model.)

E. S. CARPENTER.
NUT LOCK.

No. 517,185. Patented Mar. 27, 1894.

Witnesses:
Hny J. Martin
Luella H. Knox.

Inventor:
Edwin S. Carpenter.
By Kay, Totten & Cooke
Attorneys.

THE NATIONAL LITHOGRAPHING COMPANY,
WASHINGTON, D. C.

UNITED STATES PATENT OFFICE.

EDWIN S. CARPENTER, OF SEWICKLEY, PENNSYLVANIA.

NUT-LOCK.

SPECIFICATION forming part of Letters Patent No. 517,185, dated March 27, 1894.

Application filed July 18, 1893. Serial No. 480,818. (No model.)

*To all whom it may concern:*

Be it known that I, EDWIN S. CARPENTER, a resident of Sewickley, in the county of Allegheny and State of Pennsylvania, have invented a new and useful Improvement in Nut-Locks; and I do hereby declare the following to be a full, clear, and exact description thereof.

My invention relates to nut-locks, its object being to provide a simple form of lock which is adapted to be slipped over the bolt and hold in whatever position it may assume and whether the nut be screwed up to such an extent that the spring of the nut-lock is overcome or the nut-lock loses its elasticity; which is not liable, as the mass of spring washer nut-locks have been found to be, to enter within the bolt hole and so prevent the proper operation of the nut-lock, and further, which will not by means of the edges thereof cut or wear into the threads of the bolt as the bolt is screwed against the washer.

To these ends my invention consists, generally stated, in a flat, split spring washer having the inner portion of the ends thereof flat, corresponding to the main body of said washer, while the outer corners of its ends are bent out of the plane of the body in opposite directions with relation to each other so that the one end will take into the fish plate or other surface to which it is applied, and the other end will hold the nut when it is screwed against the washer.

To enable others skilled in the art to make and use my invention I will describe the same more fully, referring to the accompanying drawings in which—

Figure 1:
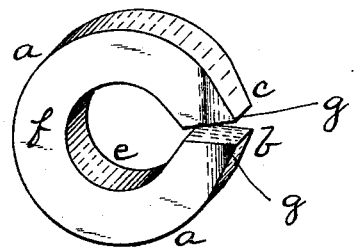
Figure 2:
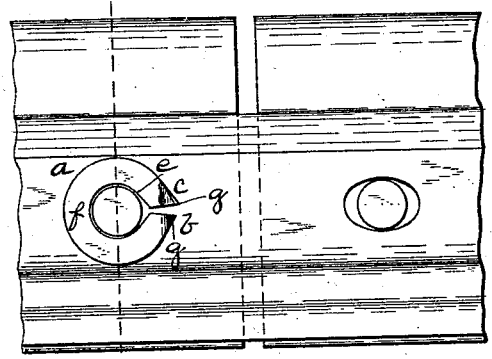
Figure 3:
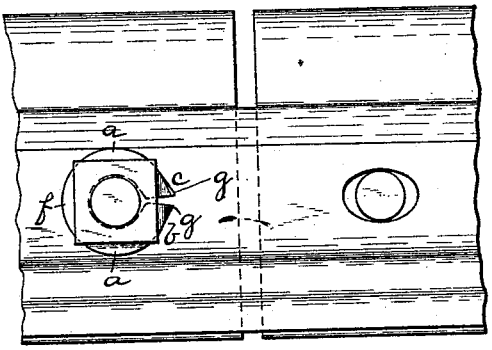
Figure 4:
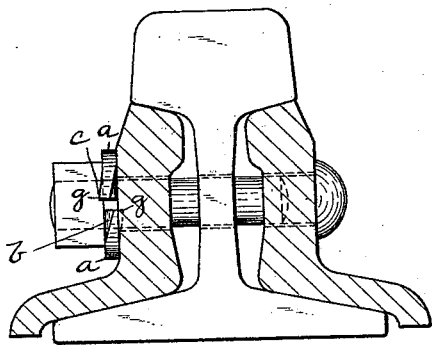
Figure 5:
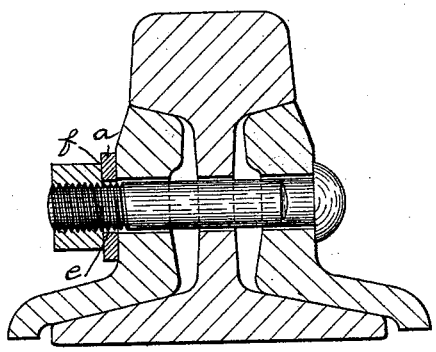
Figure 6:
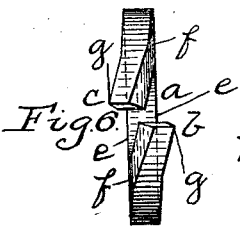

Figure 1 is a perspective view of the washer. Fig. 2 shows the same applied to the bolt and before the nut is screwed upon the washer. Fig. 3 shows the nut screwed upon the washer and the engagement of the holding lip therewith. Fig. 4 is an edge view showing the washer against the fish plate. Fig. 5 is a section on the line 5—5 Fig. 2 showing the washer upon the bolt and the nut engaging therewith, and Fig. 6 is an end view of the washer.

Like letters of reference indicate like parts in each of the views.

The washer is made from steel and is formed from a flat body of steel, which, when heated, is bent to the desired coiled or spring split washer shape, the washer having the body portion $a$ and the two ends $b$, $c$, the end $b$ being adapted to engage with the fish plate, while the end $c$ engages with the nut. The washer is made sufficiently helical to give the necessary spring to hold the nut in place, the whole body being bent into this helical shape but being oval in shape instead of round. That is to say, the central opening $e$ is preferably made half of a circle in the body thereof opposite to the ends $b$, $c$, and the portions thereof extending therefrom to the ends are made flatter than the regular circle would be, so as to form the opening oval and to hold the two ends away from the thread of the bolt so that the square edges of the ends will not cut into the thread of the bolt and mar it, as is usual in this branch of spring washer nut-locks. This has the further advantage that the engaging points hereinafter referred to, and especially the point engaging the fish plate, is thrown farther from the bolt, and therefore is carried to such a point that it will not enter into the oblong hole of the fish plate, but will extend beyond such hole and engage with the body of such plate. It has the further advantage that it gives a greater leverage for the hold of the spring washer upon the fish plate in proportion to the greater distance from the center of the bolt to the point engaging with the fish plate. It will be seen that at the ends $b$, $c$ the engaging points are formed by bending the outer corner portions of the washer out of the plane of the body in opposite directions with relation to each other, leaving the body thereof nearest to the central opening flat, as shown at $f$. This has two advantages, (first,) that it gives the hold upon the fish plate at the outermost point of the washer; and (second,) that it forms first an inclined surface over which the nut passes as it is screwed on, and then a square edge for engagement with the nut which can hold the nut without cutting into the same, but in case the nut is turned the projecting point $g$ will cut into the nut and hold it. These features of construction are found to be of value in the practical use of the washer, as they prevent the cutting out of the thread of the bolt by means of the oblong central opening of the flat spring washer, prevent the washer from entering into the bolt hole of the fish plate, give the greatest leverage for the hold of the washer upon the fish plate, and, finally, by the turning over of the corners only instead of the whole edge of the washer, form a seat to receive the body of the nut, which will hold the same even if the washer loses its spring power, because the nut can be brought against the whole body of the washer and the turned-up corners $g$ will prevent its turning and passing and so working off.

The washer is simple in construction, can be made at low cost, and overcomes the objections generally found to this class of helical spring washer nut-locks which engage by cutting points in the fish plate and nut.

What I claim as my invention, and desire to secure by Letters Patent, is—

A nut-lock formed of a flat spring helical nut-washer having the inner portions of its ends flat corresponding to the main body of said washer, and the outer corners of its ends bent out of the plane of the body in opposite directions to each other to form the biting or holding edge, substantially as and for the purposes set forth.

In testimony whereof I, the said EDWIN S. CARPENTER, have hereunto set my hand.

EDWIN S. CARPENTER.

Witnesses:
J. N. COOKE,
LUELLA H. KNOX.